(12) United States Patent
Wu et al.

(10) Patent No.: US 10,600,290 B2
(45) Date of Patent: Mar. 24, 2020

(54) AUTOMATIC HAPTIC GENERATION BASED ON VISUAL ODOMETRY

(71) Applicant: Immersion Corporation, San Jose, CA (US)

(72) Inventors: Liwen Wu, Montreal (CA); Jamal Saboune, Montreal (CA); Paige Raynes, Walnut Creek, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/378,686

(22) Filed: Dec. 14, 2016

(65) Prior Publication Data

US 2018/0165926 A1    Jun. 14, 2018

(51) Int. Cl.
 *G08B 6/00* (2006.01)
 *G06F 3/01* (2006.01)
 (Continued)

(52) U.S. Cl.
 CPC .............. *G08B 6/00* (2013.01); *G06F 3/016* (2013.01); *G06K 9/00335* (2013.01);
 (Continued)

(58) Field of Classification Search
 CPC ........................................................ G06T 7/20
 See application file for complete search history.

(56) References Cited

U.S. PATENT DOCUMENTS 5,973,733 A * 10/1999 Gove ..................... H04N 5/145
                                                      348/142
7,577,199 B1 * 8/2009 Herz ................ G08B 13/19608
                                                      348/143
(Continued)

FOREIGN PATENT DOCUMENTS

EP    1 549 047 A2    6/2005
EP    1 959 675 A2    8/2008
(Continued)

OTHER PUBLICATIONS

EP 17207458.5, "Extended European Search Report", dated Sep. 11, 2018, 22 pages.
(Continued)

*Primary Examiner* — Nay A Maung
*Assistant Examiner* — Jose Torres
(74) *Attorney, Agent, or Firm* — Kilpatrick Townsend & Stockton LLP

(57) ABSTRACT

Examples of devices, systems, and methods to automatically generate haptics based on visual odometry are disclosed. In one example, a video having a plurality of frames is received and an optical flow estimate between a first frame from the plurality of frames and a second frame from the plurality of frames is created. In this example, the second frame is subsequent to the first frame. An apparent movement of a stationary object between the first frame and the second frame is detected based at least in part on the optical flow estimate in this example and at least one haptic effect corresponding to the apparent movement of the stationary object is generated based at least in part on the optical flow estimate. The generated haptic effect(s) may be output to a haptic file or a haptic output device, or both.

19 Claims, 10 Drawing Sheets
(4 of 10 Drawing Sheet(s) Filed in Color)

(51) Int. Cl.
*G06T 7/269* (2017.01)
*G06K 9/00* (2006.01)
*H04N 5/14* (2006.01)

(52) U.S. Cl.
CPC .... *G06T 7/269* (2017.01); *G06T 2207/10016* (2013.01); *H04N 5/145* (2013.01)

(56) References Cited

U.S. PATENT DOCUMENTS

| | | | | |
|---|---|---|---|---|
| 7,660,439 | B1* | 2/2010 | Lu | G06K 9/00711 |
| | | | | 348/699 |
| 7,817,822 | B2* | 10/2010 | Sun | G06K 9/32 |
| | | | | 348/103 |
| 9,064,385 | B2 | 6/2015 | Saboune et al. | |
| 9,305,362 | B1* | 4/2016 | Szedo | H04N 5/23254 |
| 2008/0130948 | A1* | 6/2008 | Ozer | G06K 9/00228 |
| | | | | 382/103 |
| 2009/0096879 | A1 | 4/2009 | Motomura et al. | |
| 2012/0162450 | A1 | 6/2012 | Park et al. | |
| 2012/0268622 | A1* | 10/2012 | Hildreth | G06F 1/1626 |
| | | | | 348/222.1 |
| 2014/0241576 | A1* | 8/2014 | Yu | G06T 7/55 |
| | | | | 382/103 |
| 2014/0267904 | A1* | 9/2014 | Saboune | G08B 6/00 |
| | | | | 348/460 |
| 2014/0350436 | A1* | 11/2014 | Nathan | A61B 5/1107 |
| | | | | 600/595 |
| 2014/0362230 | A1* | 12/2014 | Bulan | G06K 9/00624 |
| | | | | 348/169 |
| 2015/0109528 | A1 | 4/2015 | Choi et al. | |
| 2015/0194034 | A1* | 7/2015 | Shim | G08B 21/0476 |
| | | | | 348/77 |
| 2015/0262376 | A1 | 9/2015 | Saboune et al. | |
| 2015/0268723 | A1* | 9/2015 | Saboune | G06F 3/016 |
| | | | | 345/156 |
| 2015/0339826 | A1* | 11/2015 | Buibas | B64D 47/08 |
| | | | | 901/1 |
| 2016/0360110 | A1* | 12/2016 | Kimura | H04N 5/23254 |
| 2017/0169311 | A1* | 6/2017 | Spampinato | G06K 9/481 |
| 2017/0372479 | A1* | 12/2017 | Somanath | G06T 5/003 |
| 2018/0061063 | A1* | 3/2018 | Buyukozturk | G06T 7/20 |
| 2018/0098082 | A1* | 4/2018 | Burns | H04N 19/117 |

FOREIGN PATENT DOCUMENTS

| | | |
|---|---|---|
| EP | 3 336 660 A2 | 6/2018 |
| WO | 2009/139723 A1 | 11/2009 |

OTHER PUBLICATIONS

Ishii et al., "High-Frame-Rate Optical Flow System", IEEE Transactions on Circuits and Systems for Video Technology, Institute of Electrical and Electronics Engineers, USA, vol. 22, No. 1, Jan. 1, 2012, pp. 105-112.

European Application No. EP17207458.5, "Office Action", dated Jul. 11, 2019, 12 pages.

* cited by examiner

AUTOMATIC HAPTIC GENERATION BASED ON VISUAL ODOMETRY

FIELD

The present application generally relates to haptic devices and more generally relates to automatic haptic generation based on visual odometry.

BACKGROUND

Traditionally, mechanical buttons have provided physical tactile sensations to users of electronic devices. However, as the size of electronic devices has decreased and the portability of electronic devices has increased, the number of mechanical buttons on electronic devices has decreased and some electronic devices do not have any mechanical buttons. Haptic output devices may be included in such devices to output haptic effects to users.

SUMMARY

Various examples are described for devices, systems, and methods to automatically generate haptics based on visual odometry.

One example disclosed method includes: receiving a video having a plurality of frames; determining an optical flow estimate between a first frame and a second frame, the second frame subsequent to the first frame; detecting an apparent movement of a stationary object between the first frame and the second frame based at least in part on the optical flow estimate; generating a haptic effect corresponding to the apparent movement of the stationary object based at least in part on the optical flow estimate; and producing the haptic effect via a haptic output device.

One example disclosed non-transitory computer-readable medium includes one or more software applications configured to be executed by a processor. In this example, the one or more software applications is configured to: receive a video having a plurality of frames; determine an optical flow estimate between a first frame and a second frame, the second frame subsequent to the first frame; detect an apparent movement of a stationary object between the first frame and the second frame based at least in part on the optical flow estimate; generate a haptic effect corresponding to the apparent movement of the stationary object based at least in part on the optical flow estimate; and produce the haptic effect via a haptic output device.

One example disclosed device configured to produce a haptic effect includes a camera, a display, a haptic output device, and a processor. In this example, the processor is in communication with the camera, the display, and the haptic output device. In this example, the processor is configured to: receive a video having a plurality of frames from the camera; determine an optical flow estimate between a first frame and a second frame, the second frame subsequent to the first frame; detect an apparent movement of a stationary object between the first frame and the second frame based at least in part on the optical flow estimate; generate a haptic signal configured to cause the haptic output device to output a haptic effect corresponding to the apparent movement of the stationary object based at least in part on the optical flow estimate; output the first frame and the second frame to the display; and output the haptic signal to the haptic output device such that the haptic output device produces the haptic effect as the second frame is displayed on the display.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated into and constitute a part of this specification, illustrate one or more certain examples and, together with the description of the example, serve to explain the principles and implementations of the certain examples.

DETAILED DESCRIPTION

Figure 1A:
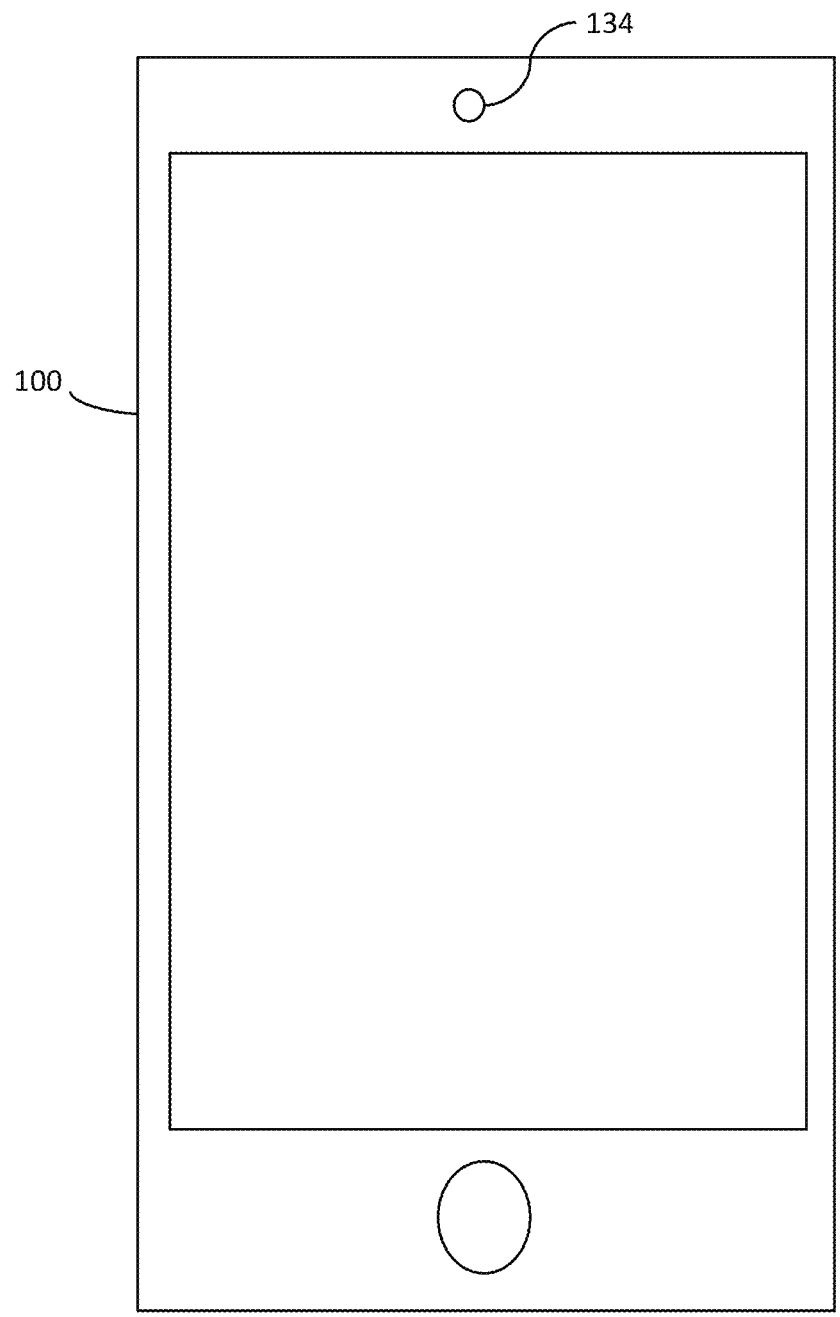
FIGS. 1A, 1B, and 1C show an example computing device for the automatic generation of haptics based on visual odometry according to an embodiment.

Examples are described herein in the context of devices, systems, and methods to automatically generate haptics based on visual odometry. In embodiments, visual odometry as used herein refers to movement of a camera when recording a video that is detected by analyzing video frames in the video to determine apparent movement of stationary objects between frames in the video that indicate the movement of the camera. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of Automatically Generating Haptics Based on Visual Odometry In one illustrative example, an action camera allows a user to record point-of-view video. After the user has used the action camera to record a point-of-view video, in this example haptic effects can automatically be generated for and added to the point-of-view video based on visual odometry. Because the point-of-view video has been recorded from a first person perspective, the motion of the person that recorded the point-of-view video can be estimated based on the movement of the action camera. Moreover, haptic effects corresponding to the movement can be generated and stored in a haptic file such that haptic effects corresponding to movements in the point-of-view video are output when the point-of-view video is played.

In this example, haptic effects are generated that correspond to apparent abrupt movements in the vertical direction of otherwise stationary objects in the point-of-view video. Because the objects are supposed to be stationary, in this example apparent abrupt movements of movement of the stationary objects in the recorded point-of-view video is caused by movement of the action camera while recording the video. In this example, haptic effects are generated based on the moving speed of the camera when the point-of-view video was recorded. For example, haptic effects can be generated based on the magnitude of the apparent movements in the vertical direction of the otherwise stationary objects between consecutive frames of the point-of-view video. The magnitude of the apparent movements in the vertical direction of the otherwise stationary objects between consecutive frames can approximate the moving speed of the camera when the point-of-view video was recorded.

In this illustrative example, haptic effects are stored in a haptic file that corresponds to the point-of-view video. For example, timing and magnitude parameters for haptic effects can be stored in a haptic file such that, when the point-of-view video is played, haptic effects are output that correspond to the apparent abrupt, vertical movements of stationary objects in the point-of-view video. As one example, the haptic file can store timing and magnitude parameters for a haptic effect such that a large haptic effect is output when there is an apparent large, abrupt vertical movement in a stationary object in the point-of-view video. As another example, if the apparent abrupt, vertical movement in a stationary object is above a threshold amount, then the haptic file can have timing and magnitude parameters such that a haptic effect with a magnitude corresponding to the magnitude of the vertical movement is output when the abrupt movement is played in the point-of-view video. In this example, if an apparent abrupt, vertical movement in a stationary object is below the threshold amount, then the haptic file may not have timing or magnitude parameters corresponding to that abrupt movement and thus a haptic effect is not output when the abrupt movement is played in the point-of-view video.

This illustrative example is given to introduce the reader to the general subject matter discussed herein and the disclosure is not limited to this example. The following sections describe various additional non-limiting examples and examples of systems and methods for automatically generating haptics based on visual odometry.

Figure 1B:
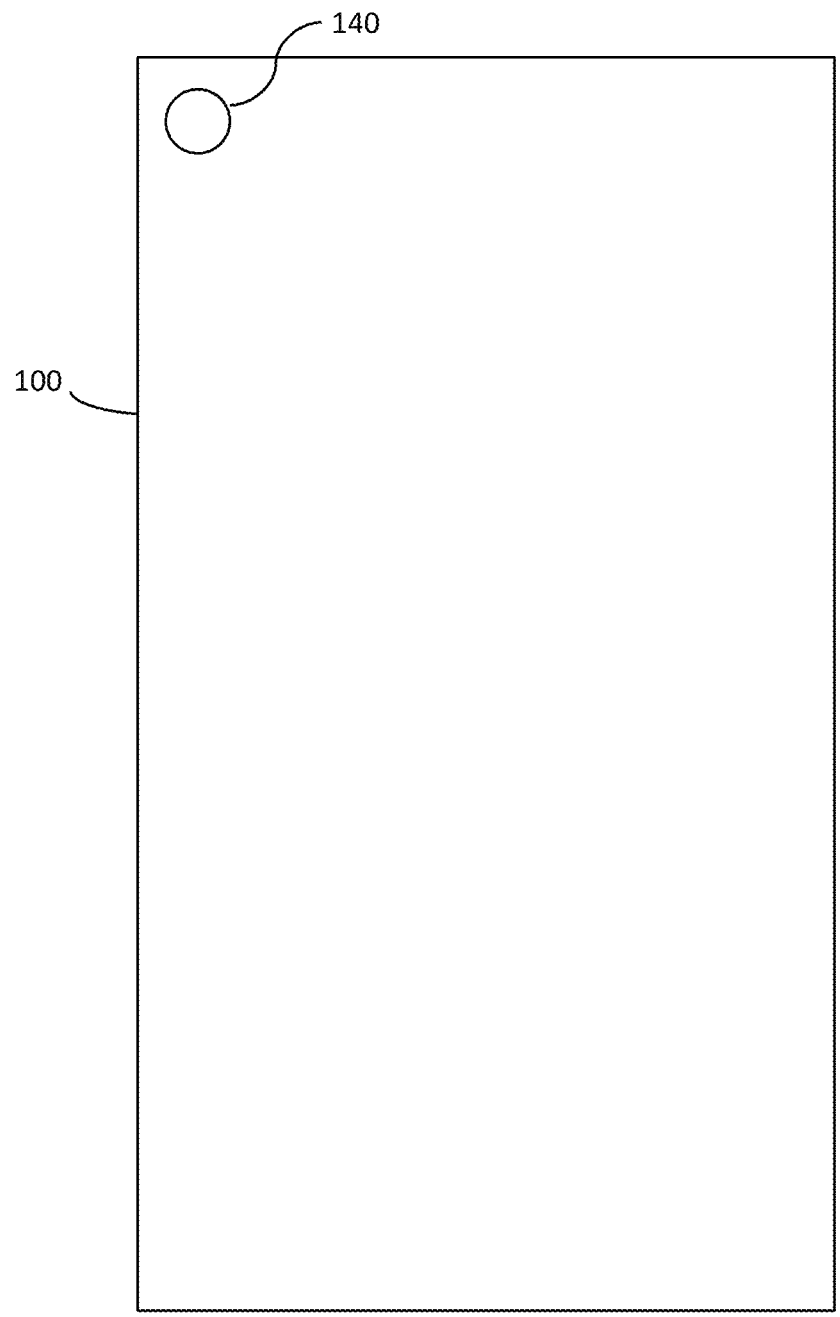
Figure 1C:
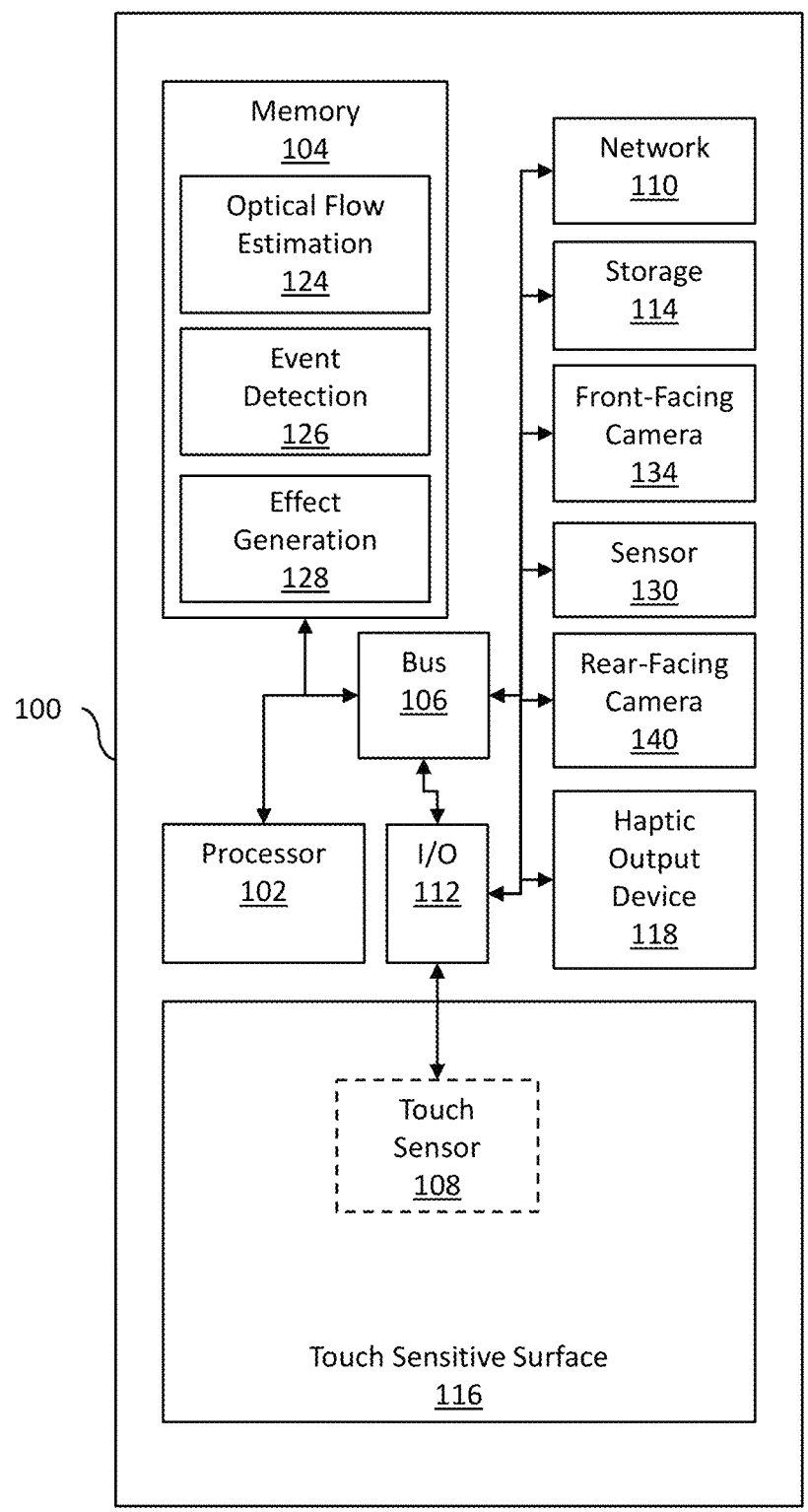

FIGS. 1A, 1B, and 1C show an example computing device 100 for the automatic generation of haptics based on visual odometry according to an embodiment. FIG. 1A shows the front of the computing device 100, FIG. 1B shows the back of the computing device 100, and FIG. 1C shows components of the computing device 100.

Figure 2:
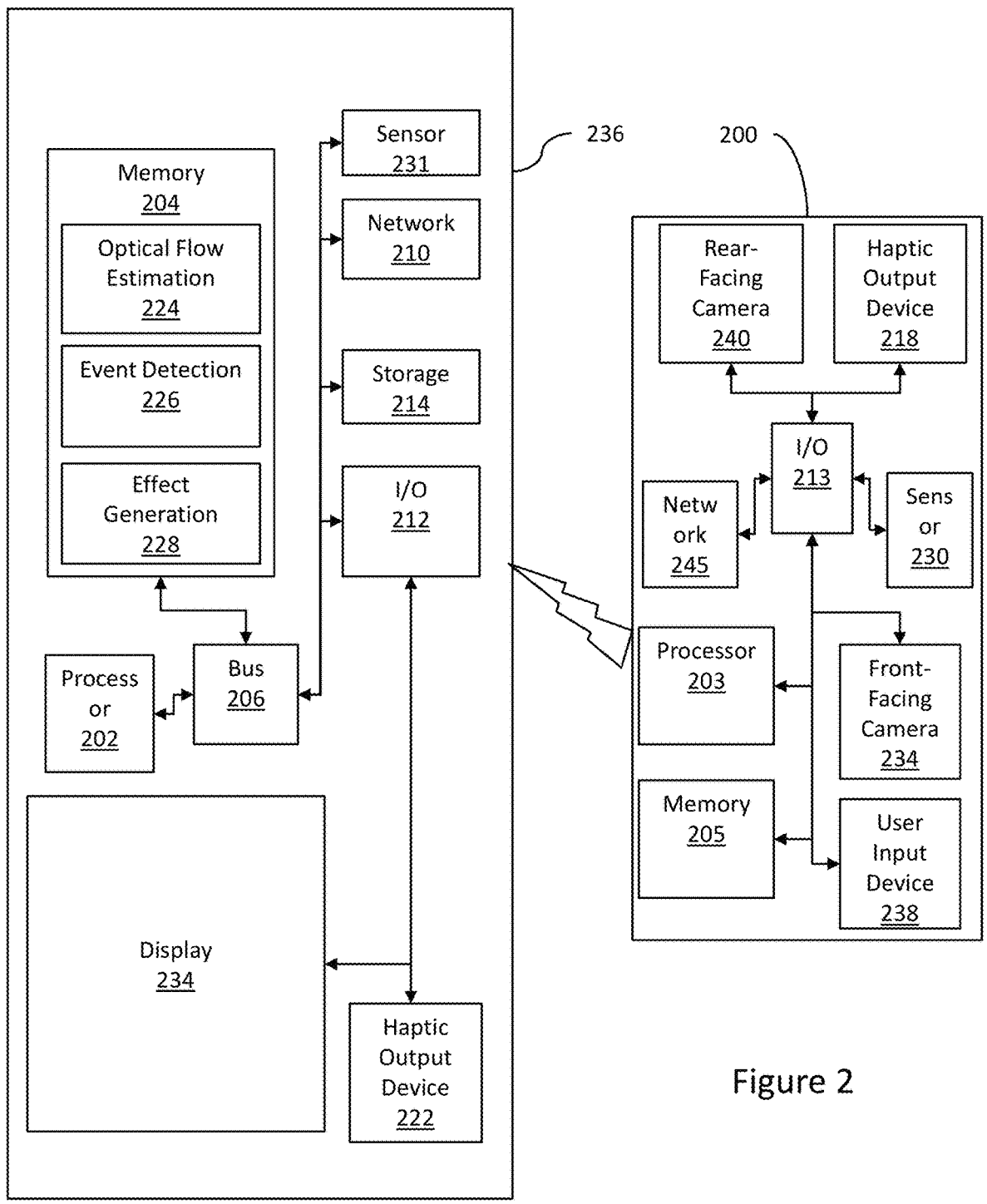
FIG. 2 shows an example system for the automatic generation of haptics based on visual odometry according to an embodiment.

The computing device 100 may comprise, for example, a digital camera, action camera, 360-degree camera, smartphone, phablet, tablet, e-reader, laptop computer, desktop computer, portable gaming device, medical device, set-top box (e.g., DVD player, DVR, cable television box), or gaming controller. In other examples, the computing device 100 may comprise a multifunction controller, for example, a controller for use in a kiosk, automobile, alarm system, thermostat, or other type of electronic device. In some examples, the computing device 100 may include wearable computing devices, such as wristwatches, bracelets, necklaces, belts, virtual reality (VR) headsets, headphones, gloves, or boots. While computing device 100 is shown as a single device in FIGS. 1A-1C, in other examples, the computing device 100 may comprise multiple devices, for example, as shown in FIG. 2.

The example computing device 100 comprises a processor 102 interfaced with other hardware via bus 106. A memory 104, which can comprise any suitable tangible (and non-transitory) computer-readable medium such as RAM, ROM, EEPROM, or the like, may embody program components that configure operation of the computing device 100. In some examples, the computing device 100 may further comprise one or more network interface devices 110, input/output (I/O) interface components 112, and additional storage 114.

Network interface device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate a connection to devices such as one or more displays, keyboards, cameras, mice, speakers, microphones, buttons, joysticks, and/or other hardware used to input data or output data. Additional storage 114 represents nonvolatile storage such as read-only memory, flash memory, random access memory (RAM), ferroelectric RAM (F-RAM), magnetic, optical, or other storage media included in the computing device 100 or coupled to processor 102.

The computing device 100 includes a touch-sensitive surface 116. In the example shown in FIG. 1C, the touch-sensitive surface 116 is integrated into computing device 100. In other examples, the computing device 100 may not comprise the touch-sensitive surface 116. Touch-sensitive surface 116 represents any surface that is configured to sense tactile input of a user. In some examples, the touch-sensitive surface 116 may be rollable, bendable, foldable, stretchable, twistable, squeezable, or otherwise deformable. For example, the touch-sensitive surface 116 may comprise a bendable electronic paper or a touch-sensitive display device.

One or more touch sensors 108 are configured to detect a touch in a touch area in some examples when an object contacts a touch-sensitive surface 116 and provide appropriate data for use by processor 102. Any suitable number, type, or arrangement of sensors can be used. For example, resistive and/or capacitive sensors may be embedded in touch-sensitive surface 116 and used to determine the location of a touch and other information, such as pressure, speed, and/or direction. As another example, optical sensors with a view of the touch-sensitive surface 116 may be used to determine the touch position.

In other examples, the touch sensor 108 may comprise a LED (Light Emitting Diode) detector. For example, in some examples, touch-sensitive surface 116 may comprise a LED finger detector mounted on the side of a display. In some examples, the processor 102 is in communication with a single touch sensor 108. In other examples, the processor 102 is in communication with a plurality of touch sensors 108, for example, touch sensors associated with a first touch-screen and a second touch screen. The touch sensor 108 is configured to detect user interaction, and based on the user interaction, transmit signals to processor 102. In some examples, touch sensor 108 may be configured to detect multiple aspects of the user interaction. For example, touch sensor 108 may detect the speed and pressure of a user interaction, and incorporate this information into the signal.

In some examples, computing device 100 may include a touch-enabled display that combines a touch-sensitive surface 116 and a display. The touch-sensitive surface 116 may correspond to the display exterior or one or more layers of material above components of the display. In other examples, touch-sensitive surface 116 may not comprise (or otherwise correspond to) a display, depending on the particular configuration of the computing device 100.

The computing device 100 also comprises one or more additional sensor(s) 130. The sensor(s) 130 are configured to transmit sensor signals to the processor 102. In some examples, the sensor(s) 130 may comprise, for example, a camera, humidity sensor, ambient light sensor, gyroscope, GPS unit, accelerometer, range sensor or depth sensor, biorhythm sensor, or temperature sensor. Although the example shown in FIG. 1C depicts the sensor 130 internal to computing device 100, in some examples, the sensor 130 may be external to computing device 100. For example, in some examples, the one or more sensors 130 may be associated with a game controller for use with a computing device 100 comprising a game system. In some examples, the processor 102 may be in communication with a single sensor 130 and, in other examples, the processor 102 may be in communication with a plurality of sensors 130, for example, a temperature sensor and a humidity sensor. In some examples, the sensor 130 may be remote from computing device 100, but communicatively coupled to processor 102, for example, as shown in FIG. 2.

Computing device 100 further includes haptic output device 118 in communication with the processor 102. The haptic output device 118 is configured to output a haptic effect in response to a haptic signal. In some examples, the haptic output device 118 is configured to output a haptic effect comprising, for example, a vibration, a change in a perceived coefficient of friction, a simulated texture, a change in temperature, a stroking sensation, an electro-tactile effect, or a surface deformation (e.g., a deformation of a surface associated with the computing device 100). Although a single haptic output device 118 is shown here, some examples may comprise multiple haptic output devices 118 of the same or different type that can be actuated in series or in concert to produce haptic effects.

In the example shown in FIG. 1C, the haptic output device 118 is internal to computing device 100. In other examples, the haptic output device 118 may be remote from computing device 100, but communicatively coupled to processor 102, for example, as shown in FIG. 2. For instance, haptic output device 118 may be external to and in communication with computing device 100 via wired interfaces such as Ethernet, USB, IEEE 1394, and/or wireless interfaces such as IEEE 802.11, Bluetooth, or radio interfaces.

In some examples, the haptic output device 118 may be configured to output a haptic effect comprising a vibration. In some such examples, the haptic output device 118 may comprise one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some examples, the haptic output device 118 may be configured to output a haptic effect modulating the perceived coefficient of friction on along a surface of the computing device 100 in response to a haptic signal. In some such examples, the haptic output device 118 may comprise an ultrasonic actuator. The ultrasonic actuator may comprise a piezo-electric material. An ultrasonic actuator may vibrate at an ultrasonic frequency, for example 20 kHz, increasing or reducing the perceived coefficient at the surface of touch-sensitive surface 116.

In some examples, the haptic output device 118 may use electrostatic attraction, for example by use of an electrostatic actuator, to output a haptic effect. The haptic effect may comprise a simulated texture, a simulated vibration, a stroking sensation, or a perceived change in a coefficient of friction on a surface associated with computing device 100 (e.g., touch-sensitive surface 116). In some examples, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example an AC signal, to the conducting layer. In some examples, a high-voltage amplifier may generate the AC signal. The electric signal may generate a capacitive coupling between the conducting layer and an object (e.g., a user's finger or a stylus) near or touching the haptic output device 118. In some examples, varying the levels of attraction between the object and the conducting layer can vary the haptic effect perceived by a user.

The computing device 100 also includes a front-facing camera 134. For example, the front-facing camera 134 shown in FIG. 1A points or faces towards a user of the computing device 100 when the computing device 100 is used by the user. The front-facing camera 134 is configured communicate a video signal to processor 102. For example, the front-facing camera 134 may send a video signal to processor 102 having 24 frames per second. In other embodiments, the front-facing camera 134 sends a video signal to processor 102 having a frame rate of 25, 30, 48, 50, 60, 72, 90, 100, 120, 144, 240, or 300 frames per second. In one embodiment, the front-facing camera 134 sends a video signal to processor 102 having between 24 and 300 frames per second. In some examples, the processor 102 is in communication with front-facing camera 134 via bus 106. In one example, the front-facing camera 134 can be used to record video, such as a point-of-view video, and the video can be stored in memory 104 or storage 114. In some examples, the front-facing camera 134 can be used to capture video, such as a point-of-view video, that is streamed to another computing device via network 110.

The computing device 100 also includes a rear-facing camera 140. For example, the rear-facing camera 140 shown in FIG. 1B points or faces away from a user of the computing device 100 when the computing device 100 is used by the user. The rear-facing camera 140 is configured communicate a video signal to processor 102. For example, the rear-facing camera 140 may send a video signal to processor 102 having 24 frames per second. In other embodiments, the rear-facing camera 140 sends a video signal to processor 102 having 25, 30, 48, 50, 60, 72, 90, 100, 120, 144, 240, or 300 frames per second. In one embodiment, the rear-facing 140 camera sends a video signal to processor 102 having between 24 and 300 frames per second. In some examples, the processor 102 is in communication with rear-facing camera 140 via bus 106. In one example, the rear-facing camera 140 can be used to record video, such as a point-of-view video, and the video can be stored in memory 104 or storage 114. In some examples, the rear-facing camera 140 can be used to capture video, such as a point-of-view video, that is streamed to another computing device via network 110.

The computing device 100 also includes memory 104. Memory 104 comprises program components 124, 126, and 128, which are depicted to show how a device can be configured in some examples to automatically generate haptics based on visual odometry.

Optical flow estimation module 124 configures the processor 102 to estimate an optical flow between frames in a video. For example, optical flow estimation module 124 can generate an optical flow estimate between two consecutive video frames in a video. The optical flow estimation module 124 may configure the processor 102 to detect certain feature pixels within certain areas within the frames of a video on which to focus when estimating an optical flow. For example, the optical flow estimation module 124 can determine one or more feature pixels within one or more areas in a video frame of a video that should remain stationary for nearby video frames but for movement of a camera that captured the video. As one example, optical flow estimation module 124 can detect one or more pixels within one or more areas that surround one or more objects shown in the video frame that should remain stationary in a subsequent video frame (such as the next video frame in the video) but for movement of the camera when capturing the video. This example can increase the efficiency of the optical flow estimation module 124 and reduce the required processing power of processor 102 by not requiring an optical flow estimate to be generated for pixels within the entire area of the video frames. In embodiments, optical flow estimation module 124 implements an algorithm—such as a phase correlation method, a block-based method, a Lucas-Kanade method, a Horn-Schunck method, a Buxton-Buxton method, a Black-Jepson method, another suitable differential method, a max-flow min-cut based algorithm, a discrete optimization method, etc.—to estimate an optical flow between pixels within at least part of two or more video frames in a video.

Optical flow estimation module 124 can receive a video having numerous frames from various sources. For example, optical flow estimation module 124 can receive a real-time video from front-facing camera 134, rear facing camera 140, or I/O 112. In one example, optical flow estimation module can receive a video stored in memory 104, storage 114, or I/O 112. In some examples, optical flow estimation module 124 can receive a streaming video via network 110.

Figure 3:
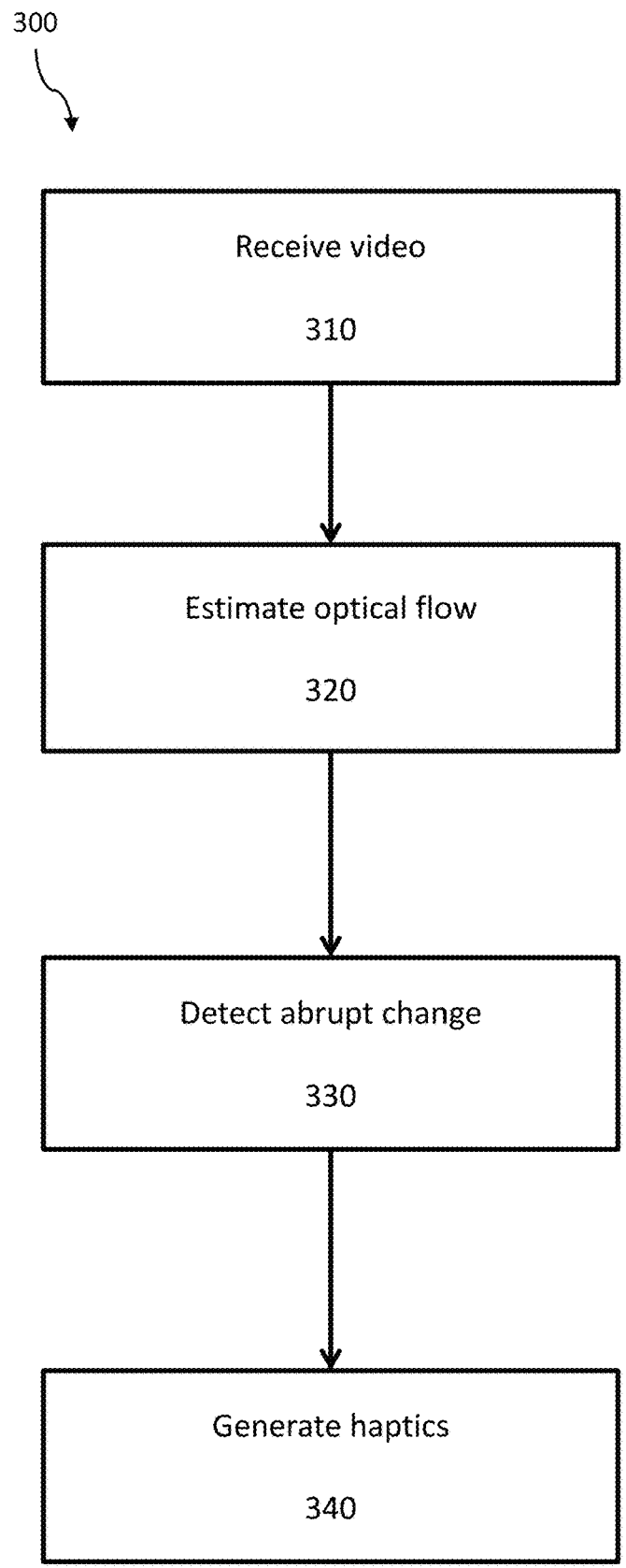
FIG. 3 shows an example method of automatically generating haptics based on visual odometry according to an embodiment.
Figure 8:
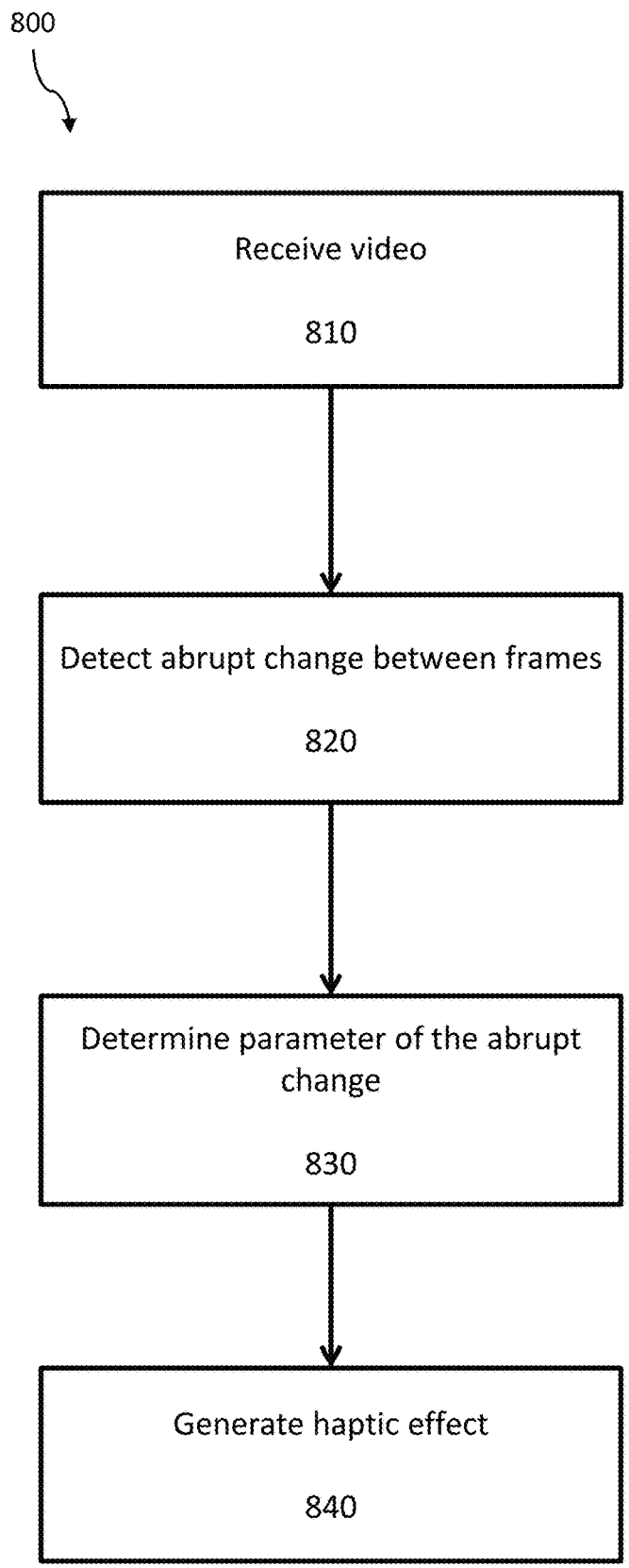
FIG. 8 shows an example method of automatically generating haptics based on visual odometry according to an embodiment.

In examples, optical flow estimation module 124 configures the processor 102 to generate an optical flow estimate between frames in a video as described herein, such as with respect to block 320 of FIG. 3 and/or block 820 of FIG. 8. Although the optical flow estimation module 124 is depicted in FIG. 1C as a program component within the memory 104, in some examples, the optical flow estimation module 124 may comprise hardware configured to estimate an optical flow. In some examples, such hardware may comprise analog to digital converters, processors, microcontrollers, comparators, amplifiers, transistors, and other analog or digital circuitry.

Event detection module 126 configures the processor 102 to detect movements between frames in a video. For example, event detection module 126 can detect abrupt movements between consecutive frames in a video. In this example, the event detection module 126 can analyze an optical flow estimate generated by optical flow estimation module 124 for the consecutive frames to determine whether there is an abrupt movement. In one embodiment, the event detection module 126 analyzes magnitudes of motion vectors in the generated optical flow estimate. For example, if the average magnitude of the motion vectors in the generated optical flow estimate exceeds a threshold magnitude, then event detection module 126 can determine that an abrupt movement in camera motion occurred when the video was captured. In some embodiments, the event detection module 126 analyzes directions of motion vectors in the generated optical flow estimate. For example, the event detection module 126 may analyze only those motion vectors that are vertical or substantially vertical and facing north or substantially north in determining whether there is an abrupt movement.

In examples, event detection module 126 configures the processor 102 to detect movements between frames in a video as described herein, such as with respect to block 330 of FIG. 3 and/or blocks 820 and/or 830 of FIG. 8. Although the event detection module 126 is depicted in FIG. 1C as a program component within the memory 104, in some examples, the event detection module 126 may comprise hardware configured to detect movements. In some examples, such hardware may comprise analog to digital converters, processors, microcontrollers, comparators, amplifiers, transistors, and other analog or digital circuitry.

Effect generation module 128 configures the processor 102 to generate haptics effects for the video. For example, effect generation module 128 can generate haptic effects can generate haptic effects based on abrupt movements between consecutive frames in a video. In this example, the effect generation module 128 can determine one or more parameters for the haptic effects based on abrupt movements between consecutive frames detected by event detection module 126. For example, if event detection module 126 detects an abrupt movement between two consecutive frames of a video, then effect generation module 128 can determine a parameter for the haptic effect that corresponds with the average magnitude of the motion vectors in the optical flow estimate generated by optical flow estimation module 124. In this example, the effect generation module 128 can determine an intensity haptic parameter corresponding to the average magnitude of the motion vectors such that larger average magnitudes result in larger intensity haptic parameters. A larger haptic intensity parameter is configured to cause a haptic output device to output a haptic effect with more force than a smaller haptic intensity parameter according to one embodiment.

Effect generation module 128 can output generated haptic effects in several ways. For example, effect generation module 128 can output generated haptic effects to haptic output device 118 as the video is played. In this example, the generated haptic effects are output to haptic output device 118 such that the haptic effects are synchronized with the video. For example, if event detection module 126 detects an abrupt movement, then effect generation module 128 can send a haptic effect signal to haptic output device 118 such that a haptic effect is output at the same time or substantially the same time as the abrupt movement occurs in the video.

As another example, effect generation module 128 can create a haptic track that is embedded within a video. In this example, effect generation module 128 can embed a haptic track in a video received by the optical flow estimation module 124. The video including the haptic track can be stored in memory 104, storage 114, and/or I/O 112. The video including the haptic track can be sent to another computing device via network 110. In these examples, when the video is played, haptic effects are output that correspond to abrupt movements in the video based on the estimated optical flow detected by optical flow estimation module 124, abrupt movements detected by the event detection module 126, and the haptic effects generated by the effect generation module 128.

In some examples, effect generation module 128 can store generated haptic effects in a separate file or otherwise can be added to the video without re-encoding the video. For example, effect generation module 128 can create a haptic track having the generated haptic effects and store the haptic track in a haptic file, such as a file having an HAPT file format. In this example, effect generation module 128 can store the haptic track in memory 104, storage 114, and/or I/O 112. The haptic file can be sent to another computing device via network 110. In these examples, when the video is played, the haptic file corresponding to the video is retrieved from memory 104, storage 114, I/O 112, and/or via network 110 and haptic effects specified within the haptic file that were generated by the effect generation module 128 are output that correspond to abrupt movements in the video. In this example, the haptic effects specified in the haptic file correspond to the estimated optical flow detected by optical flow estimation module 124, abrupt movements detected by the event detection module 126, and the haptic effects generated by the effect generation module 128.

In examples, effect generation module 128 configures the processor 102 to generate haptic effects corresponding to the video as described herein, such as with respect to block 340 of FIG. 3 and/or block 840 of FIG. 8. Although the effect generation module 128 is depicted in FIG. 1C as a program component within the memory 104, in some examples, the effect generation module 128 may comprise hardware configured to generate haptic effects. In some examples, such hardware may comprise analog to digital convertors, processors, microcontrollers, comparators, amplifiers, transistors, haptic output devices, and other analog or digital circuitry.

Referring now to FIG. 2, this figure is a block diagram showing an example system for the automatic generation of haptics based on visual odometry according to an embodiment. The system comprises a computing system 236. In some embodiments, computing system 236 may comprise, for example, a digital camera, action camera, 360-degree camera, smartphone, phablet, tablet, e-reader, laptop computer, desktop computer, portable gaming device, medical device, set-top box (e.g., DVD player, DVR, cable television box), or gaming controller.

The computing system 236 comprises a processor 202 in communication with other hardware via bus 206. The computing system 236 also comprises a memory 204, which comprises an optical flow estimation module 224, event detection module 226, and effect generation module 228. These components may be configured to function similarly to the memory 104, optical flow estimation module 124, event detection module 126, and effect generation module 128 depicted in FIG. 1C, respectively.

The computing system 236 also comprises network interface device 210, I/O components 212, storage 214, sensors 231, and haptic output device 222. These components may be configured to function similarly to the network interface device 110, I/O components 112, storage 114, sensors 130, and haptic output device 118 depicted in FIG. 1C, respectively.

The computing system 236 further comprises a display 234. In some embodiments, the display 234 may comprise a separate component, e.g., a remote monitor, television, or projector coupled to processor 202 via a wired or wireless connection.

The computing system 236 is communicatively coupled to a computing device 200. In some embodiments, computing system 200 may comprise, for example, a digital camera, action camera, 360-degree camera, smartphone, phablet, tablet, e-reader, laptop computer, desktop computer, portable gaming device, medical device, set-top box (e.g., DVD player, DVR, cable television box), or gaming controller.

The computing device 200 may comprise a processor 203, memory 205, optical flow estimation module 224 (not shown), event detection module 226 (not shown), and effect generation module 228 (not shown). The computing device 200 may also comprise a network interface device 245. Processor 203, memory 205, optical flow estimation module 224, event detection module 226, effect generation module 228, and network interface 245 may be configured to function similarly to the processor 102, memory 204, optical flow estimation module 124, event detection module 126, effect generation module 128, and network interface 110 depicted in FIG. 1C, respectively. In the example shown in FIG. 2, the computing device 200 comprises the network interface device 245 and is in communication with computing system 236 via a wireless interface, such as IEEE 802.11, Bluetooth, or radio interfaces (e.g., transceiver/antenna for accessing a CDMA, GSM, UMTS, or other mobile communications network).

The computing device 200 comprises I/O components 213, which may be configured to function in similar ways as the I/O components 112 depicted in FIG. 1C. The computing device 200 also comprises a user input device 238 in communication with the I/O components 213. The user input device 238 comprises a device for allowing user interaction with the computing device 200. For example, the user input device 238 may comprise a joystick, directional pad, button, switch, speaker, microphone, touch-sensitive surface, and/or other hardware used to input data.

The computing device 200 further comprises one or more sensors 230, front-facing camera 234, rear-facing camera 240, and haptic output device 218. These components may be configured to function similarly to the sensors 130, front-facing camera 134, rear-facing camera 140, and haptic output device 118 depicted in FIG. 1C, respectively.

Referring now to FIG. 3, this figure illustrates an example method 300 of automatically generating haptics based on visual odometry according to an embodiment. In this example, method 300 can determine motion of a camera used to capture a video and automatically generate haptics based on the motion. As an example, method 300 can be particularly useful in detecting motion in a point-of-view video where the motion of the first person can be approximated based on camera movement. Reference will be made with respect to FIGS. 1A, 1B, 1C, and/or 2; however, any suitable device according to this disclosure may be employed to automatically generate haptic effects based on visual odometry according to various embodiments.

The method 300 begins at block 310 when a video is received. In one example, a video is received by processor 102 from rear-facing camera 140. The video may be a point-of-view video. In some examples, the video is a real-time video and in other examples the video is a previously-recorded video file stored in memory 104, storage 114, or an I/O component 112 is received by processor 102. In one embodiment, a video is streamed from computing device 200 to computing system 236. In another embodiment, a prerecorded video file is downloaded from computing device 200 to computing system 236. In these examples, processor 202 in computing system 236 can receive a video from computing device 200 via networks 245 and 210. A video can have a plurality of frames. For example, a video may have a frame rate of 25, 30, 48, 50, 60, 72, 90, 100, 120, 144, 240, or 300 frames per second. In embodiments, a video has between 24 and 300 frames per second.

At block 320, an optical flow estimate corresponding to the video is determined. In examples, a processor receiving a video is configured to generate an optical flow estimate by an optical flow estimation module. For example, processor 102 in FIG. 1C can be configured by optical flow estimation module 124 to estimate an optical flow. As another example, processor 202 and/or processor 203 can be configured by optical flow estimation module 224 to generate an optical flow estimate.

An optical flow estimate as used herein is a pattern of apparent motion of an object in a video between frames of the video caused by the relative motion between a camera capturing the video and the object in the video. For example, a video may be a point-of-view video showing a person walking down a hall towards an open door. In this example, a door frame of the open door is a stationary object that does not move in reality; however, in the point-of-view video the door frame moves within various frames of the point-of-view video because the camera capturing the video is moving with the person walking down the hall towards the open door.

In this example, the relative motion of the door frame between frames in the video corresponds to movements of the camera when capturing the video as the person walks down the hall towards the open door. For example, an optical flow estimate can be generated to show the pattern of apparent motion of the door frame in the video between frames of the video caused by the relative motion of the camera that captured the video and the door frame in the video.

An optical flow estimate can be generated for at least two frames in the video. For example, an optical flow estimate is generated for two consecutive frames in the received video in one embodiment. In some examples, an optical flow estimate is generated for two non-consecutive frames in the received video. For example, one frame used in generating an estimated optical flow may be separated by at least one frame from another frame also used in generating the optical flow estimate. In one example, a frame that is used in generating an optical flow estimate is selected from the received video based at least in part on a frame rate of the video. For example, a number of frames between two frames in the video that are used to generate an optical flow estimate can be approximately ten percent of the video's frame rate. In examples, an optical flow estimate is generated over two consecutive frames in the video. In other examples, one or more frames can be skipped and an optical flow estimate can be generated using a video frame at time t and another video frame at time (t+x).

Figure 4:
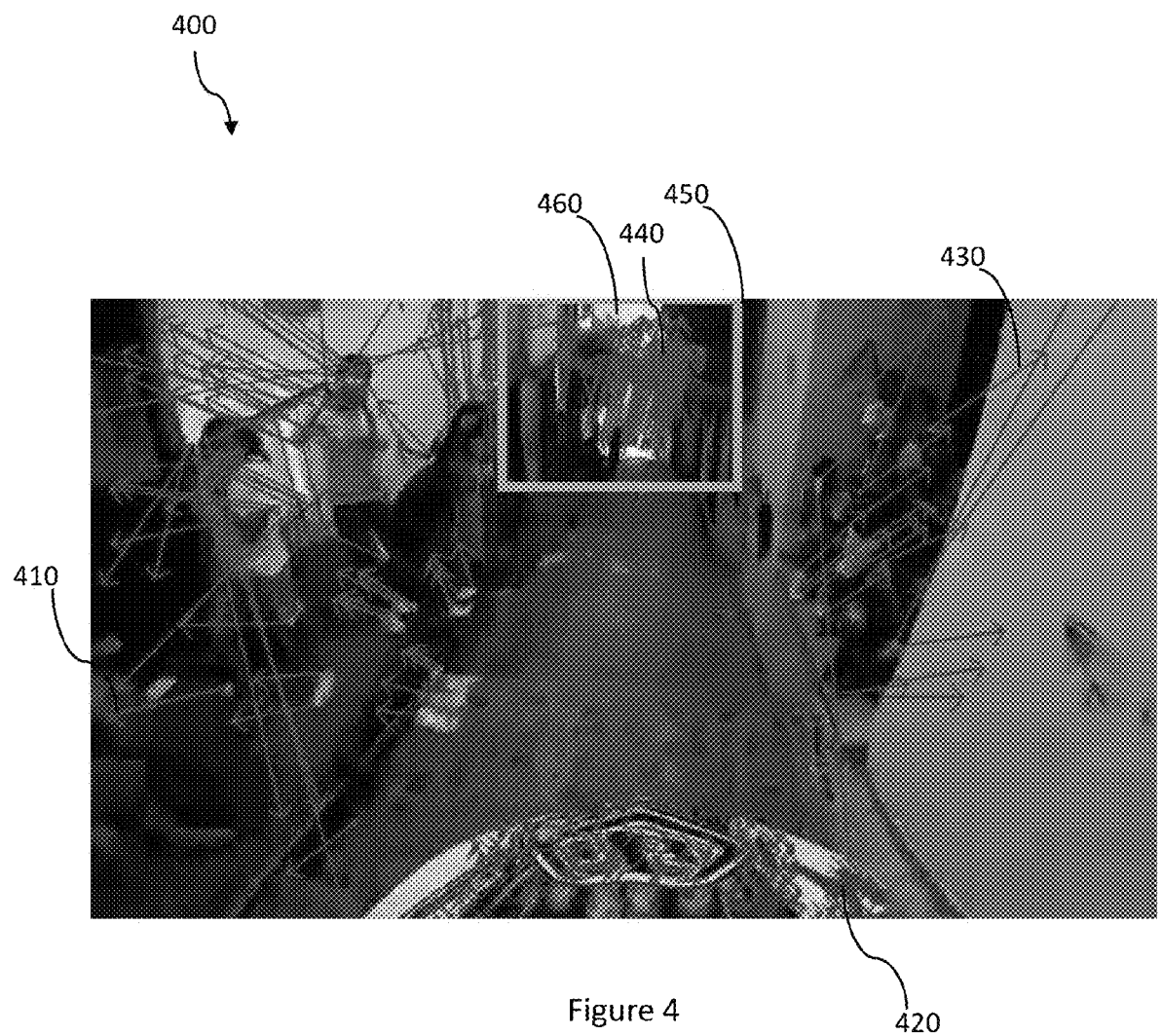
FIG. 4 shows an example optical flow estimate for a video frame according to an embodiment.

In some examples, an estimated optical flow is generated for detected features in frames of a video. For example, referring now to FIG. 4, this figure shows an estimated optical flow 400 between detected features in two consecutive frames in a video. In this example, the estimated optical flow 400 includes motion vectors, such as motion vectors 410, 420, 430, 440 shown in FIG. 4, for objects in the frames of the video used to generate the optical flow estimate. In this example, after the estimated optical flow 400 has been generated, motion vectors can be analyzed to determine a partial area within the frames of the video to focus when generating subsequent motion vectors for the video. For example, the motion vectors shown in FIG. 4 may be analyzed to find feature pixels within a partial area 450 in which there is a cluster of motion vectors (e.g., motion vector 440 and the surrounding motion vectors within partial area 450) pointing in approximately a same direction and having approximately a same magnitude.

In embodiments, a filter is applied to a video frame prior to estimating an optical flow to reduce noise within the video frame. In embodiments, a filter is applied to a generated optical flow estimate to reduce noise within the optical flow estimate.

In one embodiment, feature pixels within a partial area within frames of a video can be determined by analyzing motion vectors within an optical flow estimate to determine a cluster of motion vectors having a similar direction and/or a similar magnitude. In this example, the determined partial area surrounds the cluster of motion vectors. For example, in FIG. 4 partial area 450 surrounds a cluster of motion vectors having a similar direction and a similar magnitude. In this example, a subsequent optical flow estimation can generate motion vectors for only feature pixels within the partial area 440 without generating motion vectors for pixels in the remaining area of the video frames. Determining a partial area in a video frame in the video in which to find feature pixels and generate an estimated optical flow for other video frames in the video in future optical flow estimations can reduce processing time and/or improve accuracy in approximating motion of a camera that captured the video by focusing on a relevant, feature pixels within a partial area of the video and ignoring the other pixels in other areas of the video.

In other examples, feature pixels within a partial area of the frames of a video can be determined prior to generating an optical flow estimate. For example, a frame in the video is analyzed to determine feature pixels of a stationary object in the video prior to generating an optical flow estimate according to one embodiment. In this example, one or more objects are detected within a video frame of the video that are expected to remain stationary in the video absent movement of the camera recording the video. Examples of stationary objects that may be detected within a video frame of a video include, but are not limited to, a building or portion thereof (e.g., a wall, a door, a window, a countertop, a staircase, etc.), a landscape (e.g., a tree, a forest, a mountain, a rock, a street, etc.), an unused home furnishing (e.g., a table, a chair, a rug, a picture), an unused vehicle (e.g., a parked car, a parked motorcycle, etc.), or another stationary object. In examples, one or more partial areas that surround the detected stationary object(s) are determined and an estimated optical flow is generated for only these partial area(s).

In some examples, feature pixels corresponding to the stationary object in the video can be determined. In one embodiment, a feature pixel is a pixel that corresponds to a corner of the stationary object in the video. In other examples, a feature pixel can be a pixel in a video frame corresponding to a stationary object that should not move between consecutive and/or subsequent frame(s) in the video but for movement of a camera that captured the video.

Motion vectors may be generated for only the feature pixels detected within partial area(s) within one or more frames of the video rather than pixels for the entire area of the video frame. Determining one or more feature pixels within a partial area in a video frame in the video prior to generating the optical flow estimate can reduce processing time and/or improve accuracy in approximating motion of a camera that captured the video by focusing on relevant feature pixel(s) within the partial area of the video and ignoring the other areas of the video.

For example, referring again to FIG. 4, feature pixel within partial area 450 are determined prior to estimating optical flow 400 (e.g., prior to generating motion vectors 410, 420, 430, 440, etc.). In this example, partial area 450 is determined by analyzing the picture to detect stationary object 460 and then selecting feature pixels within an area that surrounds the detected stationary object 460. In this example, motion vectors are generated for only certain pixels only within partial area 450. No motion vectors would be generated for pixels in areas outside of partial area 450 (e.g., motion vectors 410, 420, 430, etc. would not be generated) in this example.

Figure 5A:
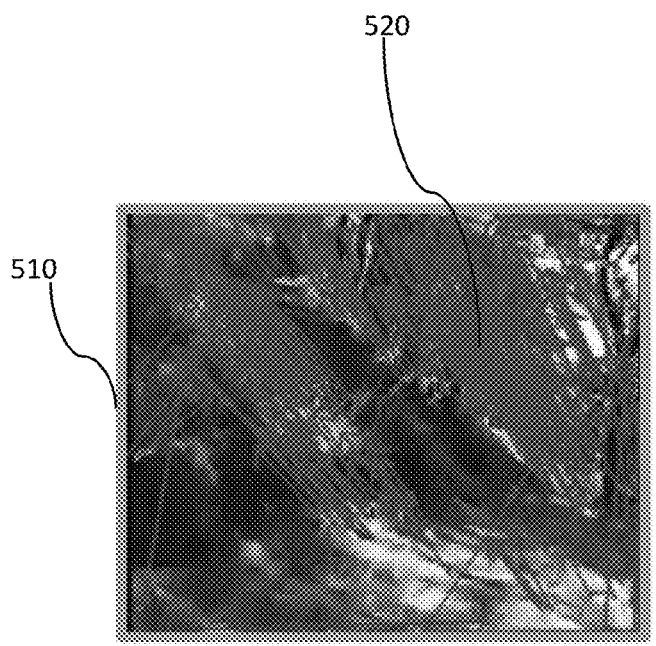
FIG. 5A shows an example optical flow estimate for feature pixels within a detected partial area in a video depicting a forest according to an embodiment.
Figure 5B:
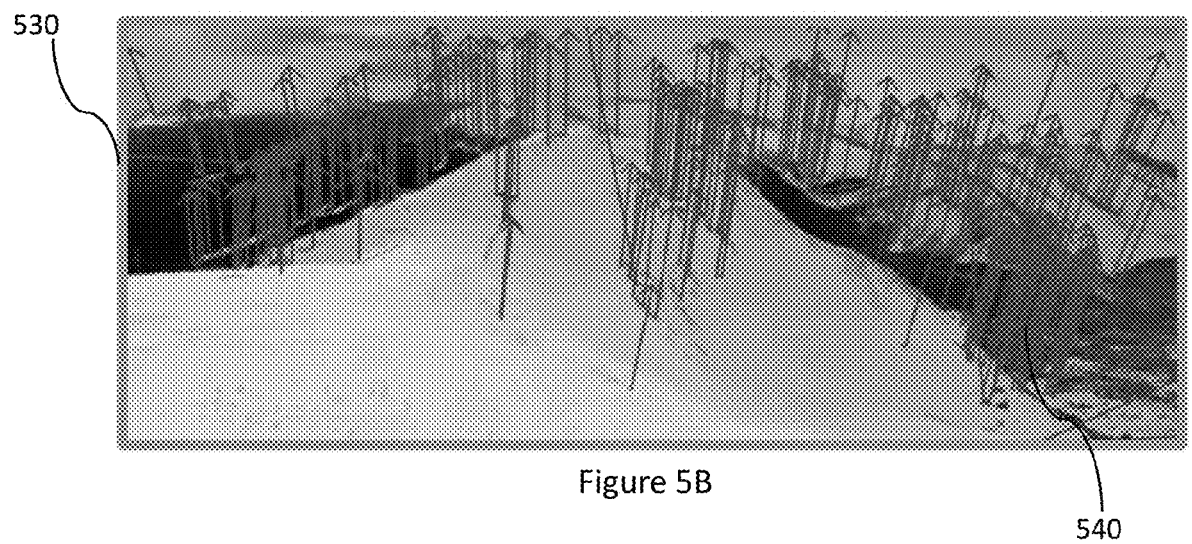
FIG. 5B shows an example optical flow estimate for feature pixels within a detected partial area in a video depicting a mountain according to an embodiment.

Referring now to FIGS. 5A and 5B, these figures each show a respective example optical flow estimate for feature pixels detected within partial areas in a video according to embodiments. For example, FIG. 5A shows a partial area 510 of a larger video frame. In this example, the partial area 510 is determined by detecting an area within the video frame surrounding the portion of the video frame that depicts a forest. In this example, an optical flow estimate may be generated having motion vectors, such as motion vector 520, corresponding only to feature pixels within the detected partial area 510 within the larger video frame. As another example, FIG. 5B shows a partial area 530 of a larger video frame. In this example, the partial area 540 is determined by detecting and surrounding an area of the video frame depicting an open mountain landscape. In this example, an optical flow estimate may be generated having motion vectors, such as motion vector 540, corresponding only to feature pixels within the detected partial area 510 within the larger video frame.

In examples, the number of motion vectors in an estimated optical flow corresponds to the number of detected pixel features in the video frames of the video. For example, an estimated optical flow may have one motion vector for each detected pixel feature in a video frame. In some examples, detected pixel features correspond to corners of an object shown in a video frame. In other examples, detected pixel features can correspond to any type of visual feature of an object shown in a video frame. In one embodiment, if a camera that captured the video is close to an object, then the video has a detailed view of the object and many pixel features corresponding to this object are detected. In this embodiment, an estimated optical flow has many motion vectors. In other embodiments, if a camera that captured the video is far away from an object, then the object in the video is not as detailed and fewer pixel features corresponding to the object are detected. In this embodiment, an estimated optical flow can have one motion vector or only a few motion vector. In this way, in some embodiments, the number of motion vectors and the concentration of motion vectors in an estimated optical flow corresponds to the number of objects in the video and how close the camera that captured the video was to those objects.

Moreover, in some examples, if the camera was close to the objects when capturing the video and the objects are close together, then the closeness of the objects to each other does not affect the detection of feature pixels and the objects in the video can be distinguished from one another because of the detail of the objects in the video. In other examples, however, if the camera was not close to the objects (e.g., the camera was far away from the objects) when capturing the video and the objects are close together, then the closeness of the objects may affect the detection of pixel features and the objects in the video may not be able to be distinguished from one another because of the lack of detail of the objects in the video. In this example, two or more objects in a video might be detected as a single object because of the lack of detail of the objects in the video and the number of detected features may be less than if the objects had been captured by the camera when it was closer to the objects.

For example, the video corresponding to the optical flow estimate shown in FIG. 5A was recorded in a forest where there are many stationary objects that are close together and the camera that recorded the video was close to the forest when it was recorded. The video corresponding to the optical flow estimate shown in FIG. 5B, however, was recorded on a mountain where many of the stationary objects, such as the trees in the background, are close together but the camera that recorded the video was farther away from the forest when the video was recorded. In this example, because the camera was closer to the objects when capturing the video corresponding to optical flow estimate for partial area 510 shown in FIG. 5A than the camera capturing the video corresponding to the optical flow estimate for partial area 530 shown in FIG. 5B, there is a higher concentration of motion vectors 520 in the optical flow estimate in FIG. 5A than the motion vectors 540 in the optical flow estimate in FIG. 5B.

In some embodiments, a size and/or a location of a partial area that is analyzed to detect feature pixels is determined by a user. In embodiments, a user may constrain feature detection to a particular shape (e.g., a rectangle, circle, triangle, user-drawn freeform shape, or other shape) within the video and specify the locations within the video that the particular shape covers. For example, a user may specify that features should be detected within a rectangle starting at pixel (i, j) of the video frames and having a width of X pixels and a height of Y pixels.

In other embodiments, a size and/or a location of a partial area is dynamically determined. In some embodiments, the size and location of a partial area can be dynamically specified or updated based on the concentration of motion vectors. For example, in one video frame features may be detected within the entire frame and then a partial area within that video frame may be determined and used for subsequent video frames. Thus, if the entirety of video frame 1 is analyzed to determine pixel features within video frame 1, then a partial area surrounding some or all of the pixel features determined for video frame 1 may be used to determine pixel features in subsequent video frames. In some examples, the process of analyzing an entire video frame to determine a partial area and then using this partial area in subsequent video frames is repeated after a number of claims. For example, if the entirety of video frame 1 is analyzed to determine a partial area and this partial area is used to identify pixel features for video frames 2 thru 50, then the entirety of video frame 51 may be analyzed to determine another partial area that is used to identify pixel features for video frames 52 thru 100, and so on.

In some examples, if a user specifies an initial partial area in which to determine pixel features, then in one video frame features may be detected within this initial partial area and then another partial area within the initial partial area may be determined that surrounds the detected features. In this example, the dynamically determined other partial area is used to detect pixel features within subsequent video frames.

In one embodiment, a determined partial area corresponds to a top, center area within the video. For example, the partial area 450 shown in FIG. 4 corresponds to a top center area within the video. In various examples, a determined partial area corresponds to a top, center, or bottom area within a video. In some examples, a determined partial area corresponds to a left, center, or right area within a video. In some embodiments, a partial area corresponding to a top, center, or bottom horizontal area and a left, center, or right vertical area within the video.

After estimating an optical flow in block 320, at block 330 an abrupt movement in the video is determined. In examples, a processor is configured by an event detection module to determine one or more abrupt movements in a video based at least in part on an optical flow estimate generated by an optical flow estimation module. For example, processor 102 in FIG. 1C can be configured by event detection module 126 to determine an abrupt movement in a video. As another example, processor 202 and/or processor 203 can be configured by event detection module 226 to determine abrupt movements in videos.

In examples, an abrupt movement in the video is determined based on motion vectors in a generated optical flow estimate. In some embodiments, an abrupt movement in the video is determined by analyzing only the motion vectors corresponding to feature pixels within a partial area of the video (which may have already been determined in block 320 or which can be determined in block 330 as described above with respect to block 320), even if there are motion vectors corresponding to pixels outside of the partial area. In embodiments, one or more of the motion vectors with the largest magnitude and/or one or more of the motion vectors with the smallest magnitude in an optical flow estimate are removed or ignored in determining an average magnitude of the motion vectors. Because motion vectors with the largest and smallest magnitudes in an optical flow estimate often come from noise, removing or ignoring such motion vectors when determining an average magnitude of the motion vectors can provide greater accuracy in detecting an abrupt movement and/or greater accuracy in matching an abrupt movement with an appropriate haptic effect.

In one example, an abrupt movement in the video is determined by analyzing motion vectors in an estimated optical flow to determine if a cluster of motion vectors point in the same or substantially same direction. For example, optical flow estimate 400 shown in FIG. 4 has a cluster of motion vectors within partial area 450 that face in a northern direction and is detected as an abrupt movement in movement in the video. In some example, the cluster of motion vectors within partial area 450 can be determined by analyzing only those motion vectors within partial area 450. In this example, the partial area 450 may be determined as part of block 320 or may be determined as part of block 330. As another example, motion vectors, such as motion vectors 410, 420, 430, 440, etc., can be analyzed to determine if that vector is part of a cluster of motion vectors facing in the same direction. For example, the motion vectors shown in FIG. 4 can be analyzed to determine that motion vector 440 is part of a cluster of motion vectors (shown within partial area 450 in FIG. 4) that face in the same or substantially same northern direction and thus is detected as an abrupt movement in the video.

In embodiments, an abrupt movement is a movement in a same direction (e.g., a movement in a vertical direction, a movement in a horizontal direction, or a movement in another specific direction) between consecutive or nearby frames in a video as depicted by motion vectors in an estimated optical flow. In some embodiments, the average magnitude of at least certain motion vectors in the optical flow estimate, must be above a threshold magnitude in order have an abrupt movement.

Figure 6A:
FIGS. 6A and 6B shows an example vertical camera shift from one frame (FIG. 6A) and another frame (FIG. 6B) according to an embodiment.
Figure 6B:

In some examples, a cluster of vertical or substantially vertical motion vectors in an optical flow estimate correspond to an abrupt vertical movement in a video which corresponds to vertical movement of a camera when recording the video. For example, FIGS. 6A and 6B each show a respective optical flow estimate (600, 650) that have motion vectors (e.g., 610, 620, 630, 660, 670, 680, etc.) that are substantially vertical and indicate abrupt vertical movements in a video that correspond with movement of a camera when recording the video.

In other examples, a cluster of horizontal or substantially horizontal motion vectors in an optical flow estimate correspond to an abrupt horizontal movement in a video which corresponds to horizontal movement of a camera when recording the video. In some examples, a cluster of motion vectors facing in a same direction or a substantially same direction in an optical flow estimate correspond to an abrupt movement in a video in the same direction or the substantially same direction which corresponds to movement of a camera in the same direction or the substantially same direction when recording the video. In some examples, motion vectors in an optical flow estimate corresponding to a video that point in the same direction correspond to a moving speed and/or a direction of movement of a camera that recorded the video.

After an abrupt movement has been determined at block 330, the method 300 proceeds to block 340. At block 340, one or more haptic effects are generated. In examples, a processor is configured by an effect generation module to generate one or more haptic effects corresponding to one or more abrupt movements in a video determined by an event detection module. For example, processor 102 in FIG. 1C can be configured by effect generation module 128 to generate a haptic effect corresponding to a determined abrupt movement in a video. As another example, processor 202 and/or processor 203 can be configured by effect generation module 228 to generate haptic effects corresponding to abrupt movements in videos.

In examples, a generated haptic effect has an intensity parameter corresponding to a motion vector in an estimated optical flow. For example, a generated haptic effect can have an intensity parameter corresponding to an average magnitude of the motion vectors in an area of the optical flow estimate that corresponds with the abrupt movement determined in block 330. As another example, a generated haptic effect can have an intensity parameter corresponding to an average magnitude of the motion vectors in a determined partial area (as discussed above with respect to block 320 and/or block 330). In these examples a larger determined average magnitude can correspond to a larger intensity parameter and a larger intensity parameter can correspond to a more intense haptic effect. In some examples, the direction and magnitude of the motion vectors in a determined partial area correspond to and are substantially similar to or equal to the direction and speed of a camera that recorded the video.

Figure 7A:
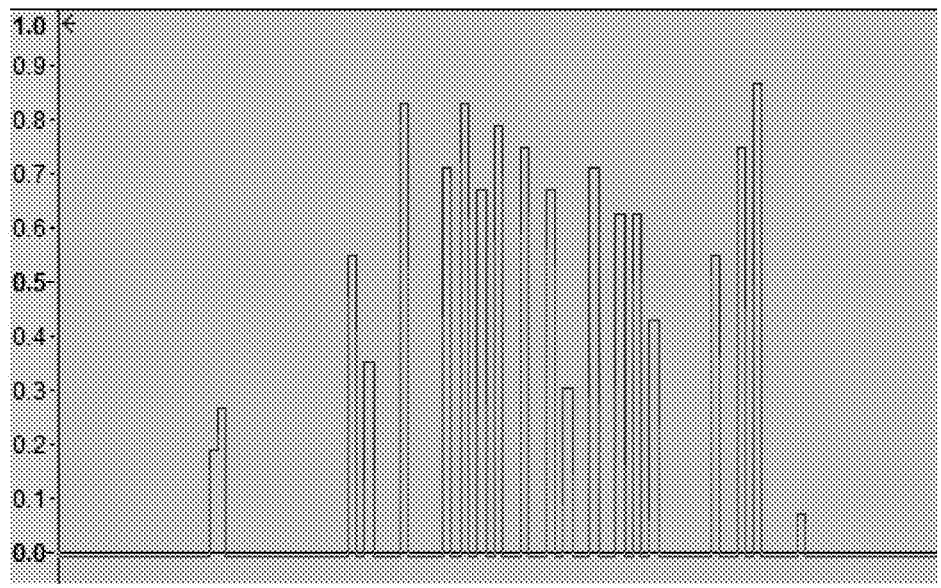
FIG. 7A shows example generated haptic effects for a video of mountain bike riding on a dirt road according to an embodiment.
Figure 7B:
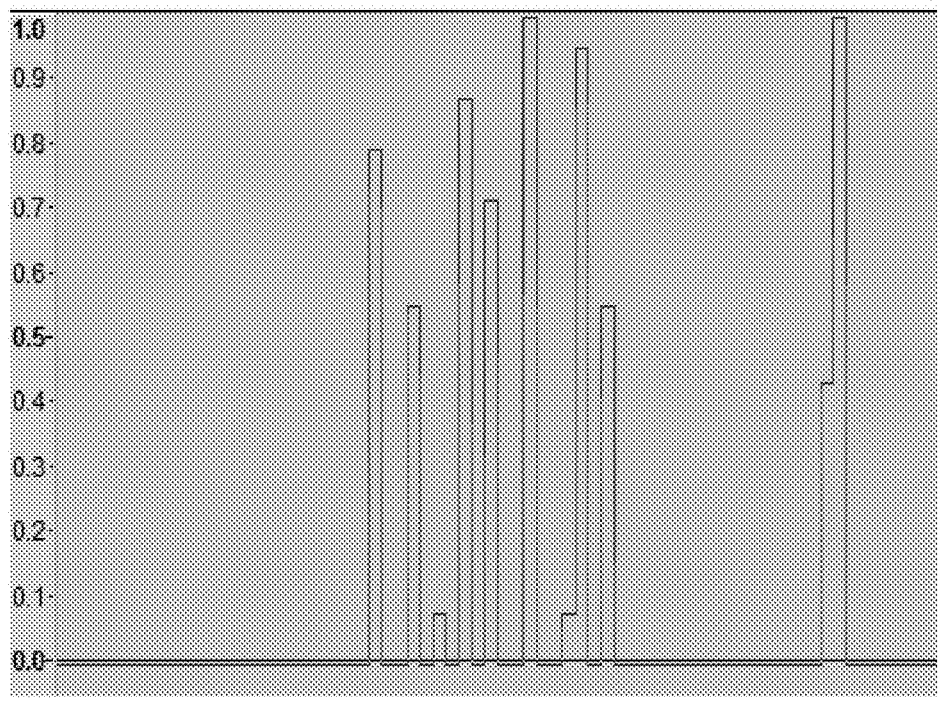
FIG. 7B shows example generated haptic effects for a video of mountain bike riding on stone according to an embodiment.

Referring now to FIGS. 7A and 7B, these figures show examples of generated haptic effects corresponding to abrupt movements in videos. In the video corresponding with the generated haptic effects shown in FIG. 7A, an action camera is mounted on a helmet of a person riding a mountain bike on a dirt road. As the person rides the mountain bike on the dirt road, the person's body and thus the action camera moves vertically. As discussed herein, an optical flow estimation module (e.g., 124, 224) can generate an optical flow estimate having motion vectors for the video recorded by the action camera and an event detection module (e.g., 126, 226) can determine abrupt movements in the video based on vertical or substantially vertical motion vectors in the generated optical flow estimate. For example, an event detection module (e.g., 126, 226) can determine abrupt movements based on vertical or substantially vertical motion vectors in the generated optical flow estimate which correspond with the person ridding on a rough section of the dirt road, hitting the ground after a jump, etc. In these examples, the camera recording the video moves in a vertical direction when these activities occur and at least some of the motion vectors in the generated optical flow estimate correspond to these movements.

Haptic effects corresponding to these movements can also be generated as shown in FIGS. 7A and 7B which shows generated haptic effects based on detected abrupt movements. As discussed above, FIG. 7A shows generated haptic effects for a video of a person riding a mountain bike on a dirt road. FIG. 7B shows generated haptic effects for a video of a person riding a mountain bike on stone steps. In embodiments, the generated haptic effects correspond to movements of the camera when the video was recorded. In these examples, the movements of the camera can be approximated based on motion vectors in an estimated optical flow. For example, a magnitude of one or more of the motion vectors in an optical flow estimate can correspond with a determined abrupt movement of the camera when the video was captured. As another example, a magnitude of one or more of the motion vectors in a determined partial area (as discussed above) may correspond with a movement of the camera when the video was recorded.

In some embodiments, one or more generated haptic effects can be stored within a video by re-encoding the video to integrate the generated haptic effects into the video. In other embodiments, one or more generated haptic effects can be stored in a separate file or otherwise can be added to the video without re-encoding the video. For example, a haptic track with the generated haptic effects can be generated and stored as a haptic file separate from the received video. In this example, the haptic file can be retrieved when the video is played and haptic effects in the haptic effect can be output which correspond with the detected abrupt movements in the video. In these examples, intensities of the haptic effects that are output when the video is played can correspond with the movement in direction and/or velocity of the camera that recorded the video as approximated based on motion vectors in generated optical flow estimate that correspond to abrupt movements in the video.

In some embodiments, one or more generated haptic effects can be output to one or more haptic output devices in real-time. For example, referring again to FIG. 2, a haptic output signal configured to cause a haptic output device to output a haptic effect generated by processor 202 and/or processor 203 can be sent to haptic output device 222. In this example, the haptic output signal is sent to haptic output device 222 such that the generated haptic effect is output by haptic output device 222 at a time that corresponds with the video frames corresponding with the determined abrupt movement, which also corresponds to the generated haptic effect, is displayed on display 234. Thus, in embodiments, an optical flow estimate can be generated, abrupt movements can be detected, and haptic effects can be generated and output in real-time such that a video that does not have haptic effects corresponding to abrupt movements in camera movement can be haptically-enhanced such that haptic effects are output at times corresponding to the abrupt movements in camera movement when the video is played.

While method 300 shown in FIG. 3 has been described above with respect to a single video feed, using method 300 with multiple video feeds is within the scope of this disclosure. For example, in embodiments, video feeds from multiple cameras (such as when filming in parallel) can be used. In some embodiments, different motion vectors for estimated optical flows corresponding to the video feeds can be combined, such as by using a data fusion technique (e.g., a Kalman filter). For example, motion vectors for an estimated optical flow corresponding to a first frame and a second frame in a first video feed can be combined with motion vectors for an estimated optical flow corresponding to a first frame and a second frame in a second video feed. In some examples, combining motion vectors for estimated optical flows from multiple video feeds provides a more accurate movement estimation.

In some embodiments, motion vectors for estimated optical flow(s) are combined with measurements from a sensor embedded in the camera that recorded the video to obtain more accurate movement estimations. For example, readings from one or more sensors (e.g., accelerometer(s), gyroscope(s), inertial measurement unit(s)) embedded in a camera that records a video can be combined with motions vectors for estimated optical flow(s) for the video to more accurately provide movement estimations for the video. In some examples, more accurate movement estimations can be made by using multiple video feeds as well as measurement from sensors in the cameras recording the video feeds.

Referring now to FIG. 8, FIG. 8 illustrates an example method 800 of automatically generating haptics based on visual odometry according to an embodiment. Reference will be made with respect to FIGS. 1A, 1B, 1C, and/or 2; however, any suitable device according to this disclosure may be employed to automatically generate haptic effects based on visual odometry according to various embodiments.

The method 800 begins at block 810 when a video is received. For example, a video may be received in one or more of the ways described herein, such as with respect to block 310 of FIG. 3.

At block 820, an abrupt movement between consecutive frames is detected. For example, an abrupt movement can be detected by generating an optical flow estimate for the received video to detect an abrupt movement, as described above with respect to blocks 320 and/or 330 of FIG. 3. In embodiments, an abrupt movement is a motion—such as an expansion, shrinking, rotation, collision, shaking, etc.—between consecutive frames in a video.

In some examples, an estimated optical flow is generated based on a reference frame in a received compressed video. For example, an optical flow estimate can be generated between a reference frame (e.g., an intra-coded picture frame, also called an "I-frame") in the compressed video and the subsequently adjacent frame in the compress video (e.g., a predicted picture frame, also called a "P-frame"). In some examples, an optical flow estimate can be generated between a reference frame in the compressed video and a subsequent non-adjacent frame (e.g., a bi-predictive picture frame, also called a "B-frame"). In one example, an optical flow estimate is generated between a P-frame and a B-frame. In some examples, an optical flow estimate can be generated for a plurality of frames. For example, an optical flow estimate can be generated between an I-frame, a P-frame, and a B-frame. An optical flow estimate may be generated over a plurality of reference frames, predicted picture frames, and/or bi-predictive picture frames. As discussed above, estimated optical flow(s) between video frames in a video can have one more motion vectors that are analyzed to determine an occurrence of an abrupt movement within the video.

Detection of abrupt movements between frames can be determined based on one or more predictive frames, such as a P-frame and/or a B-frame. In some examples, contain image data or motion vector displacement, or both. Often predictive frames require fewer bits for encoding than non-predictive frames, such as an I-frame. In these examples, an abrupt movement in a compressed video can be detected based on the image data or motion vector displacement, or both, in the predictive frames. In some examples, image data from a corresponding I-frame does not need to be analyzed to determine whether an abrupt movement occurred in the video. For example, if the image data and/or motion vector displacements indicate that there is movement for all or an abrupt majority of the pixels in the predictive frame(s), then an abrupt movement can be detected for those frame(s). In this example, the abrupt movement corresponds to movement of a camera that recorded the video. As another example, if the image data and/or motion vector displacements indicate that there is an object that is moving and the pixels in the frame(s) surrounding the object are also moving, then an abrupt movement can be detected for those frame(s) that correspond to an object moving through space. If the image data and/or motion vector displacements indicate that there is an object that is moving and the pixels in the frame(s) surrounding the object are not moving, then an abrupt movement can be detected for those frame(s) that correspond to an object moving through an otherwise stationary scene. For example, it may indicate an abrupt movement that is a car driving along an otherwise empty road.

At block 830, a parameter corresponding to the detected abrupt movement in the received video is determined. For example, a parameter corresponding to the detected abrupt movement can be determined based on an optical flow estimate generated for the received video, as described above with respect to block 340 of FIG. 3.

As discussed above with respect to block 820 of FIG. 8, an optical flow estimate can be generated based at least in part on a predictive frame in the received video. In these examples, a parameter corresponding to the detected abrupt movement can be based on information in the predictive frame, such as image data or motion vector displacement, or both, in the predictive frames. For example, an intensity parameter for a haptic effect can be correlated with motion vector displacement in one or more predictive frames, such as a P-frame and/or a B-frame. In this example, larger motion vector displacement causes a larger intensity parameter to be determined which, in turn, causes a more intense haptic effect to be output. The more intense haptic effect correlates with the abrupt movement in motion of the video as determined by the motion vector displacement in the predictive frame(s).

At block 840, a haptic effect corresponding to the abrupt movement is generated. In some examples, the haptic effect is based at least in part on the determined parameter of the abrupt movement. For example, an intensity of the haptic effect may be based on the parameter of the abrupt movement. In this example, a larger parameter of the abrupt movement results in a generated haptic effect that has a larger, corresponding intensity. For example, a haptic effect can be generated and output to a haptic output device to cause the haptic output device to output the generated haptic effect when the corresponding abrupt movement in the video is displayed. In this example, the generated haptic effect can have an intensity parameter corresponding to one or more motion vectors in the estimated optical flow corresponding to the detected abrupt movement. In some examples, a haptic effect is generated and stored in a haptic track. A haptic effect can be generated and output in one or more of the ways described herein, such as with respect to block 340 of FIG. 3.

While some examples of devices, systems, and methods herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method of producing a haptic effect comprising:
   receiving a video having a plurality of frames;
   determining a partial area of a video frame;
   detecting an abrupt camera movement, comprising:
      determining an optical flow estimate of one or more stationary objects within the partial area between a first frame and a second frame, the second frame subsequent to the first frame;
      detecting an apparent abrupt movement of the one or more stationary objects within the partial area between the first frame and the second frame based at least in part on the optical flow estimate and a magnitude threshold;
      determining the abrupt camera movement based on the apparent abrupt movement of the one or more stationary objects;
   generating a haptic effect corresponding to the abrupt camera movement; and
   producing the haptic effect via a haptic output device.

2. The method of claim 1, wherein the video comprises at least one of a video file, a real-time video, or a point-of-view video.

3. The method of claim 1, wherein the first frame and the second frame are consecutive frames in the plurality of frames.

4. The method of claim 1, wherein the second frame is separated from the first frame by at least one frame in the plurality of frames and wherein the second frame is near the first frame.

5. The method of claim 1, wherein the second frame is selected from the plurality of frames based at least in part on a frame rate of the video.

6. The method of claim 1, wherein determining the optical flow estimate comprises:
   determining a plurality of feature pixels within the partial area of the first frame; and
   generating a plurality of motion vectors corresponding to the plurality of feature pixels within the partial area of the first frame and a corresponding plurality of feature pixels within partial area of the second frame that indicates the apparent abrupt movement of the one or more stationary objects between the first frame and the second frame.

7. The method of claim 6, wherein detecting the apparent abrupt movement of the one or more stationary objects comprises detecting a same direction or a substantially same direction of the plurality of motion vectors.

8. The method of claim 6, wherein the plurality of feature pixels within the partial area is determined based at least in part on a detection of the one or more stationary objects and wherein the partial area surrounds the one or more stationary objects.

9. The method of claim 6, wherein the plurality of feature pixels within the partial area correspond with a plurality of feature pixels from a prior optical flow estimate corresponding to a frame other than the first frame in the plurality of frames.

10. The method of claim 6, wherein the partial area comprises a top-center portion of the first frame and a corresponding top-center portion of the second frame.

11. The method of claim 6, wherein a size of the partial area is based at least in part on a number of detected stationary objects.

12. The method of claim 1, wherein the apparent abrupt movement of the one or more stationary objects is detected by determining a cluster of motion vectors within the optical flow estimate having a same direction or a substantially same direction and having a magnitude exceeding the magnitude threshold.

13. The method of claim 12, wherein the generated haptic effect comprises an intensity corresponding with a magnitude of at least one motion vector within the cluster of motion vectors.

14. The method of claim 1, wherein the haptic effect is output to a haptic track.

15. A non-transitory computer-readable medium comprising processor-executable instructions configured to cause a processor to:
   receive a video having a plurality of frames;
   determine a partial area of a video frame;
   detect an abrupt camera movement based on processor-executable instructions configured to cause a processor to:
      determine an optical flow estimate of one or more stationary objects within the partial area between a first frame and a second frame, the second frame subsequent to the first frame;
      detect an apparent abrupt movement of the one or more stationary objects within the partial area between the first frame and the second frame based at least in part on the optical flow estimate and a magnitude threshold;
      determine the abrupt camera movement based on the apparent abrupt movement of the one or more stationary objects;
   generate a haptic effect corresponding to the abrupt camera movement; and
   produce the haptic effect via a haptic output device.

16. The non-transitory computer-readable medium of claim 15, wherein the optical flow estimate comprises a plurality of motion vectors and the apparent abrupt movement of the stationary object is detected based on a cluster of the motion vectors pointing in a same or a substantially same direction and having a magnitude exceeding the magnitude threshold.

17. The non-transitory computer-readable medium of claim 16, wherein the haptic effect comprises an intensity parameter based at least in part on a magnitude of a motion vector from the cluster of the motion vectors that corresponds to the abrupt camera movement.

18. A device configured to produce a haptic effect, comprising:
   a camera;
   a display;

a haptic output device;

a non-transitory computer-readable medium; and a processor in communication with the camera, the display, and the haptic output device, wherein the processor is configured to execute processor-executable instructions stored in the non-transitory computer-readable medium to:

receive a video having a plurality of frames from the camera;

determine a partial area of a video frame;

detect an abrupt camera movement based on processor-executable instructions configured to cause the processor to:

determine an optical flow estimate of one or more stationary objects within the partial area between a first frame and a second frame, the second frame subsequent to the first frame;

detect an apparent abrupt movement of the one or more stationary objects within the partial area between the first frame and the second frame based at least in part on the optical flow estimate and a magnitude threshold;

determine the abrupt camera movement based on the apparent abrupt movement of the one or more stationary objects;

generate a haptic effect corresponding to the abrupt camera movement; and output the first frame and the second frame to the display; and cause the haptic output device to produce the haptic effect as the second frame is displayed on the display.

19. The device of claim 18, wherein the apparent abrupt movement of the stationary object is detected by determining a cluster of motion vectors within the optical flow estimate having a same direction or a substantially same direction and having a magnitude exceeding the magnitude threshold.

* * * * *